(12) United States Patent
Victorazzo

(10) Patent No.: US 7,851,040 B2
(45) Date of Patent: Dec. 14, 2010

(54) METHODS FOR MAKING COMPOSITE MATERIAL COMPONENTS ESPECIALLY USEFUL FOR AIRCRAFT, AND COMPOSITE MATERIAL COMPONENTS THEREOF

(75) Inventor: Danilo Seixas Victorazzo, Sao Jose dos Campos (BR)

(73) Assignee: Embraer - Empresa Brasileira de Aeronautica S.A., Sao Jose dos Campos - SP (BR)

( * ) Notice: Subject to any disclaimer, the term of this patent is extended or adjusted under 35 U.S.C. 154(b) by 408 days.

(21) Appl. No.: 11/923,247

(22) Filed: Oct. 24, 2007

(65) Prior Publication Data
US 2009/0110871 A1  Apr. 30, 2009

(51) Int. Cl.
*B32B 5/12* (2006.01)
(52) U.S. Cl. .................. 428/110; 428/109; 428/112
(58) Field of Classification Search .......... 428/112, 428/109, 110; 244/123.1, 133; 416/230
See application file for complete search history.

(56) References Cited

U.S. PATENT DOCUMENTS 6,838,148 B1 * 1/2005 Ehnert et al. ................ 428/109

OTHER PUBLICATIONS

Daniel, Issac M., Engineering Mechanics of Composite Materials, pp. 157-158, ISBN 0-19-507506-4 (1994).
Jones, Robert M. Mechanics of Composite Materials, $2^{nd}$ Ed., pp. 218-221, ISBN 1-56032-712-X (1998).

* cited by examiner

*Primary Examiner*—Alexander Thomas
(74) *Attorney, Agent, or Firm*—Nixon & Vanderhye P.C.

(57) ABSTRACT

Methods and resulting laminate structures are provided wherein the lay-up of composite materials is accomplished more symmetrically and more continuously as compared to prior techniques to form a composite structure from two composite parts in which their principal laminate directions form a non-singular angle.

25 Claims, 4 Drawing Sheets

METHODS FOR MAKING COMPOSITE MATERIAL COMPONENTS ESPECIALLY USEFUL FOR AIRCRAFT, AND COMPOSITE MATERIAL COMPONENTS THEREOF

TECHNOLOGICAL FIELD

The technology herein relates to composite material components. More particularly, the technology herein relates to methods of making composite material components and to the components thereby made that are especially useful in aircraft, such as primary flight surfaces (e.g., aircraft wings, horizontal stabilizer and the like). The technology is especially useful for making primary flight surfaces which are attached at an angle to the aircraft structure.

BACKGROUND AND SUMMARY

The relatively high strength and light weight of fiber-reinforced composite materials (e.g., materials comprised of fibers of high strength and modulus, such as carbon fibers, glass fibers and the like which are embedded in or bonded to a resin matrix) have attracted interest in the aircraft industry as a means to construct aircraft components, for example, primary flight surfaces such as aircraft wings, horizontal stabilizers and the like. The assembly of at least two composite parts wherein their laminate principal directions form a non-singular angle brings about a series of design and manufacturing inconveniences. In extreme situations, such design and/or manufacturing inconveniences compromise the applicability of composite materials for particular components even though the physical characteristics of composite materials are more desirable as compared to components formed of light weight metal (e.g., aluminum).

Best weight savings and traditional structural behavior of wings and stabilizers are obtained when their composite skin layer angles are defined relative to their main load carrying directions, usually aligned with the longest direction of these parts which is typically the principal laminate direction (sometimes also referred as the laminate reference axis).

The junction zones between two or more regions of a part with conflicting laminate principal directions (as may be expected on junctions between aircraft wings and stabilizer skin sides) is usually designed by manufacturing such parts separately, and then joining the parts later by mechanical means, such as metal splices. However such a splicing technique is disadvantageous for a number of reasons. For example, splicing may cause the appearance of stress concentration points and fiber interruptions due to the need for joining rivets and associated drillings, thereby highly reducing the composite part's strength. Also, the use of rivets involves a time consuming additional manufacturing step.

If carbon fibers are the reinforcing media in the composite material, then galvanic interaction may occur between the carbon fibers of the composite material and aluminum of the splices. Such galvanic interaction will thereby cause corrosion of the metal forming the splices. As a consequence, the carbon fibers must be isolated physically from the metal splices using adjacent adhesive layers and/or glass fiber-reinforced composite layers.

Thermal expansion loads also need to be accounted for when using metal splices due to the different thermal expansion coefficients of the materials (i.e., since metals such as aluminum, expand and contract more than composite materials formed, for example, of carbon reinforcing fibers).

There is also the problem of increased assembly tolerances thereby requiring the use of liquid and/or rigid shims. Generally speaking therefore an increased number of parts, higher production costs and periodic maintenance issues need to be resolved when conventional metal splices are used to join composite material parts.

Another known technique that is employed to assemble wings or stabilizer skins is positioning alternating layers from the two principal lamination axes among each other in the junction zone between the parts. This technique also poses several problems including:

- all loads are transmitted through interlaminar shear, aggravated by involving regions with different elastic properties;
- potential unbalanced laminates at the junction zone;
- the structural understanding of these joints are normally associated with complex numerical analyses, many times validated only by expensive physical tests; and/or
- a concentrated superposition of plies may cause assembly problems with spars, stringers or ribs.

Recently, in U.S. Pat. No. 6,908,526 issued on Jun. 21, 2005 (the entire content of which is expressly incorporated herein by reference), a process for manufacturing part or all the composite material assembly comprising at least two zones in which the principal directions form an angle different than 0° and 180°, making use of a continuous lay-up technique. Although the possibility to perform a continuous lay-up for some lamination techniques is possible, the process proposed by the US '526 patent has a distinct disadvantage of providing at the same ply level different lay-up directions, namely a 0° layer on one side of the lay-up is reflected in the other side as a $\pm\alpha°$ layer.

It would therefore be desirable if balanced laminate structures could be formed cost-effectively and efficiently. It is towards fulfilling such needs that the present technology is directed.

Broadly, the present technology is embodied illustratively in methods and resulting laminate structures wherein the lay-up of composite materials is accomplished more symmetrically and more continuously as compared to prior techniques to form a composite structure from two composite parts in which their principal laminate directions form a non-singular angle.

According to one exemplary implementation, a method for making a composite structure comprised of at least two parts joined to one another at a central junction zone with a non-singular angle, by laying up 0° composite material plies relative to a central coordinate system COORD C of the central junction zone so as to achieve $+(90°-\theta°/2)$ plies relative to left and right coordinate systems COORD L and COORD R, respectively, of the at least two parts, and laying up $+(180°-\theta°)$ and $-(180°-\theta°)$ plies relative to the central coordinate system COORD C of the central junction zone so as to achieve $-(90°-\theta°/2)$ plies relative to left and right coordinate systems COORD L and COORD R, respectively, of the at least two parts. In preferred forms, the lay-up steps are practiced sequentially.

According to another exemplary implementation, the method may comprise laying up 90° composite material plies relative to the central coordinate system COORD C of the central junction zone so as to achieve $-\theta°/2$ plies relative to the left and right coordinate systems COORD L and COORD R, respectively, of the at least two parts; and laying up $+(90°-\theta°)$ and $-(90°-\theta°)$ composite material plies relative to the central coordinate system COORD C of the central junction zone so as to achieve $+\theta°/2$ plies relative to the left and right coordinate systems COORD L and COORD R, respectively, of the at least two parts.

In especially preferred embodiments, the lay-up steps are practiced sequentially one after the other. The nonsingular angle θ may be greater than 90° and less than 180°. Thus, for example, θ may be between about 120° or about 135°.

An exemplary composite structure may be comprised of a central junction zone, and at least two parts joined to one another at the central junction zone with a non-singular angle, the composite structure including (i) 0° composite material plies relative to a central coordinate system COORD C of the central junction zone, the 0° composite material plies forming +(90°−θ°/2) plies relative to left and right coordinate systems COORD L and COORD R, respectively, of the at least two parts, and (ii) +(180°−θ°) and −(180°−θ°) plies relative to the central coordinate system COORD C of the central junction zone, the +(180°−θ°) and −(180°−θ°) plies forming −(90°−θ°/2) plies relative to left and right coordinate systems COORD L and COORD R, respectively, of the at least two parts.

In other implementations, the composite structure may additionally or alternatively comprise (iii) 90° composite material plies relative to the central coordinate system COORD C of the central junction zone, the 90° plies forming θ°/2 plies relative to the left and right coordinate systems COORD L and COORD R, respectively, of the at least two parts; and (iv) +(90°−θ°) and −(90°−θ°) composite material plies relative to the central coordinate system COORD C of the central junction zone, the +(90°−θ°) and −(90°−θ°) plies forming +θ°/2 plies relative to the left and right coordinate systems COORD L and COORD R, respectively, of the at least two parts.

The methods and composite structures may be in the form of an aircraft component, for example, primary flight structures such as an aircraft wing, horizontal stabilizer or the like.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

The exemplary illustrative non-limiting implementations herein relate to forming a composite structure from two composite parts utilizing a lay-up procedure which creates a balanced laminate. As used herein and in the accompanying claims, the term "balanced laminate" means a laminate which is formed of pairs of composite material layers with identical thickness and elastic properties, but have +α and −α orientations of their principal material axes with respect to the laminate reference axes. (Daniel, Isaac M., Engineering Mechanics of Composite Materials, Oxford University Press, Oxford, 1995, incorporated by reference herein.) According to the exemplary illustrative non-limiting implementations disclosed herein, balanced laminate structures are achieved.

Figure 1:
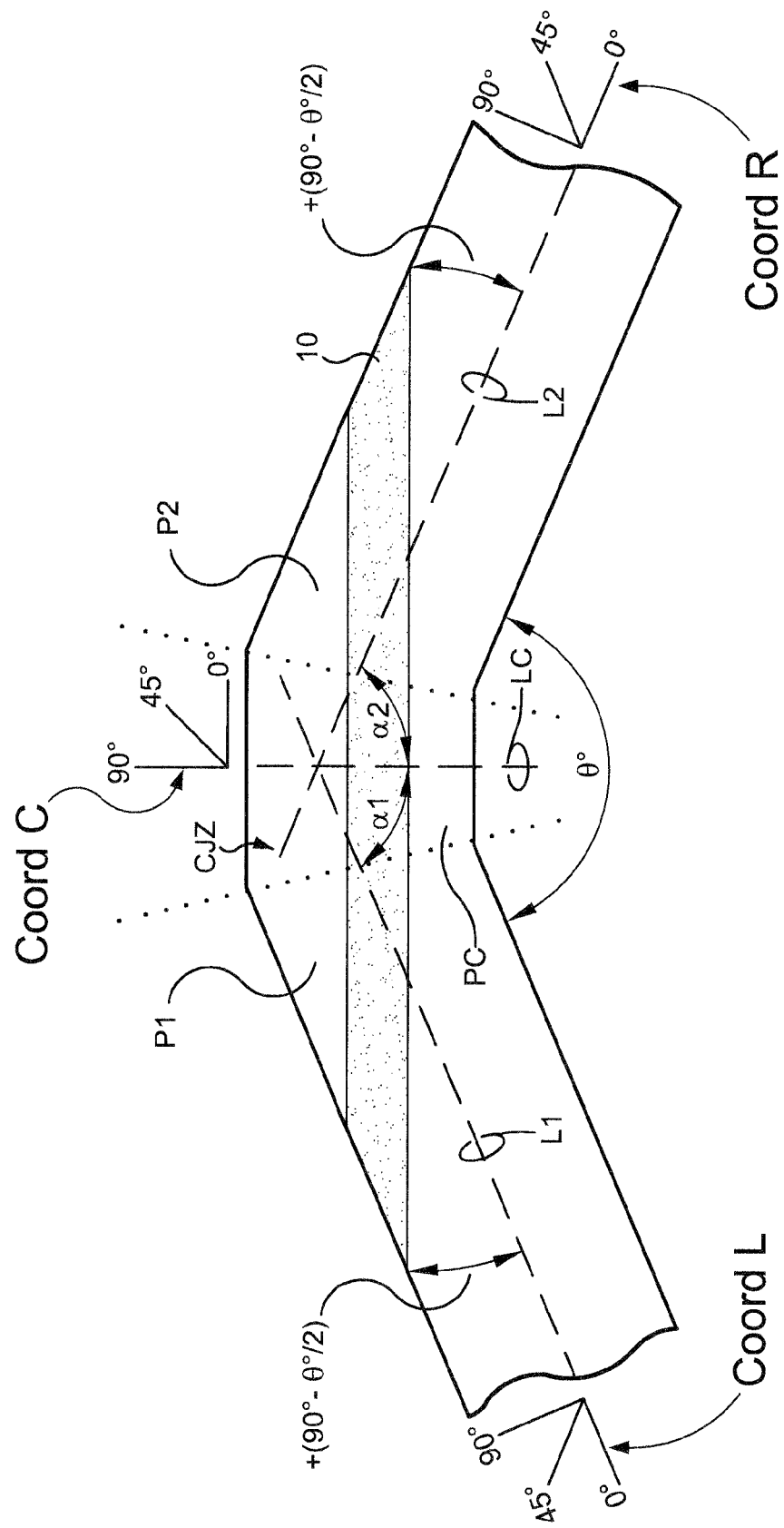
FIG. 1A is a schematic top plan view diagram of an exemplary illustrative non-limiting composite material component showing a first technique for composite material lay-up.

In this regard, referring to FIG. 1, two nonaligned component parts P1 and P2 are joined together with a central part PC in a central junction zone CJZ (noted generally by the dotted lines). Each of the parts P1, P2 and PC has a respective longitudinal axis L1, L2 and LC. Axis LC is coincident with the central axis of the laminate structure while axes L1 and L2 form respective equal angles α1 and α2 with respect to the axis LC. The junction zone CJZ establishes a central coordinate system COORD C, while each of the parts P1 and P2 establish left and right coordinate systems COORD L, COORD R, respectively.

In a first lay-up procedure as depicted in FIG. 1, 0° plies are laminated relative to the central coordinate system COORD C which results in +(90°−θ°/2) plies relative to the principal laminate directions of both of the reference left and right coordinate systems COORD L, COORD R, respectively. An exemplary composite material ply which is laminated relative to 0° of the central coordinate system COORD C is depicted in FIG. 1 by reference numeral 10. Tables 1 and 2 below exemplify the angular relationships for θ angles of 135° and 120°, respectively, using the lay-up procedure of FIG. 1.

TABLE 1

| Example for θ° = 135° | | |
| --- | --- | --- |
| θ° | | |
| 135° | | |
| Left Side lay-up Coord L Reference | Junction Zone lay-up Coord C Reference | Right Side lay-up Coord R Reference |
| +(90° − θ°/2) +22.5° | 0° 0° | +(90° − θ°/2) +22.5° |

TABLE 2

| Example for θ° = 120° | | |
| --- | --- | --- |
| θ° | | |
| 120° | | |
| Left Side lay-up Coord L Reference | Junction Zone lay-up Coord C Reference | Right Side lay-up Coord R Reference |
| +(90° − θ°/2) +30° | 0° 0° | +(90° − θ°/2) +30° |

As can be seen from FIG. 1 and the exemplary angle data in Tables 1 and 2 above, no ply interruption is necessary and both parts P1 and P2 are laminated with the same angle ply +(90°−θ°/2) simultaneously. Also, the junction zone CJZ having the central coordinate system COORD C will naturally exhibit a balanced 0° ply.

Figure 2:
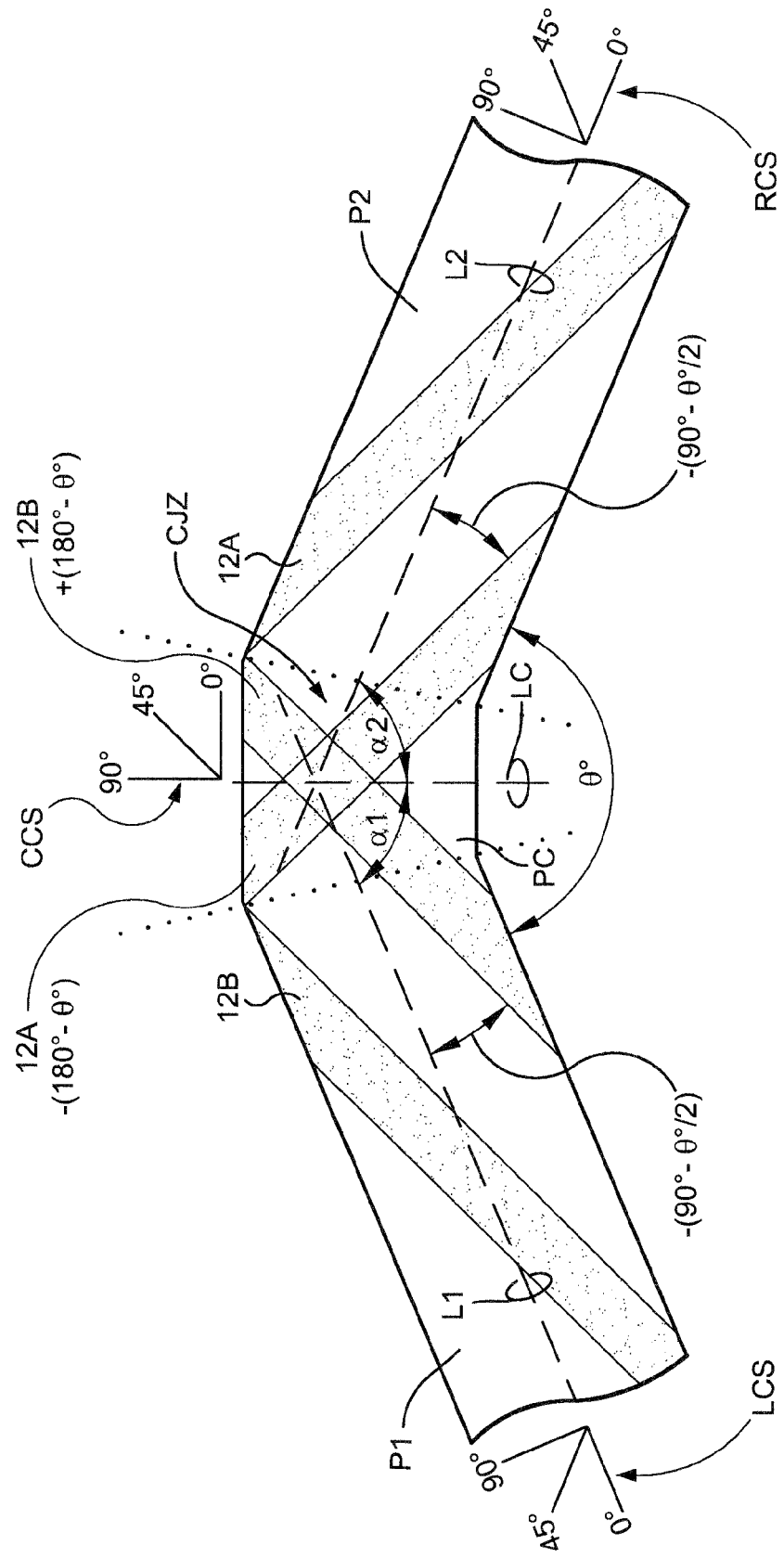
FIG. 2 is a schematic top plan view diagram of the exemplary illustrative non-limiting composite material component depicted in FIG. 1 showing a second technique for composite material lay-up.

A second lay-up procedure is shown in FIG. 2. In preferred embodiments, the second lay-up procedure is subsequently practiced after one or more plies are formed by the lay-up procedure shown in FIG. 1. In this regard, it will be observed that plies 12A and 12B are laminated at −(180°−θ°) and +(180°−θ°), respectively, relative to the central coordinate system COORD C. Such a lay-up procedure thereby results in −(90°−θ°/2) plies relative to the principal laminate directions of both of the reference left and right coordinate systems COORD L, COORD R, respectively. Tables 3 and 4 below exemplify the angular relationships for θ angles of 135° and 120°, respectively, using the lay-up procedure of FIG. 2.

TABLE 3

Example for θ° = 135°
θ°
135°

| Left Side lay-up Coord L Reference | Junction Zone lay-up Coord C Reference | Right Side lay-up Coord R Reference |
|---|---|---|
| −(90° − θ°/2) | +(180° − θ°) | — |
| — | −(180° − θ°) | −(90° − θ°/2) |
| −22.5° | +45° | — |
| — | −45° | −22.5° |

TABLE 4

Example for θ° = 120°
θ°
120°

| Left Side lay-up Cord L Reference | Junction Zone lay-up Coord C Reference | Right Side lay-up Coord R Reference |
|---|---|---|
| −(90° − θ°/2) | +(180° − θ°) | — |
| — | −(180° − θ°) | −(90° − θ°/2) |
| −30° | +60° | — |
| — | −60° | −30° |

The lay-up procedure of FIG. 2 may therefore be used to provide balancing for the +(90°−θ°/2) plies laminated by the lay-up procedure of FIG. 1 discussed previously. Combining the two lay-up procedures of FIGS. 1 and 2, the parts P1 and P2 are formed with a balanced laminate ±(90°−θ°/2), while the central junction zone CJZ is also formed with balanced laminates 0° and ±(180°−θ°).

Figure 3:
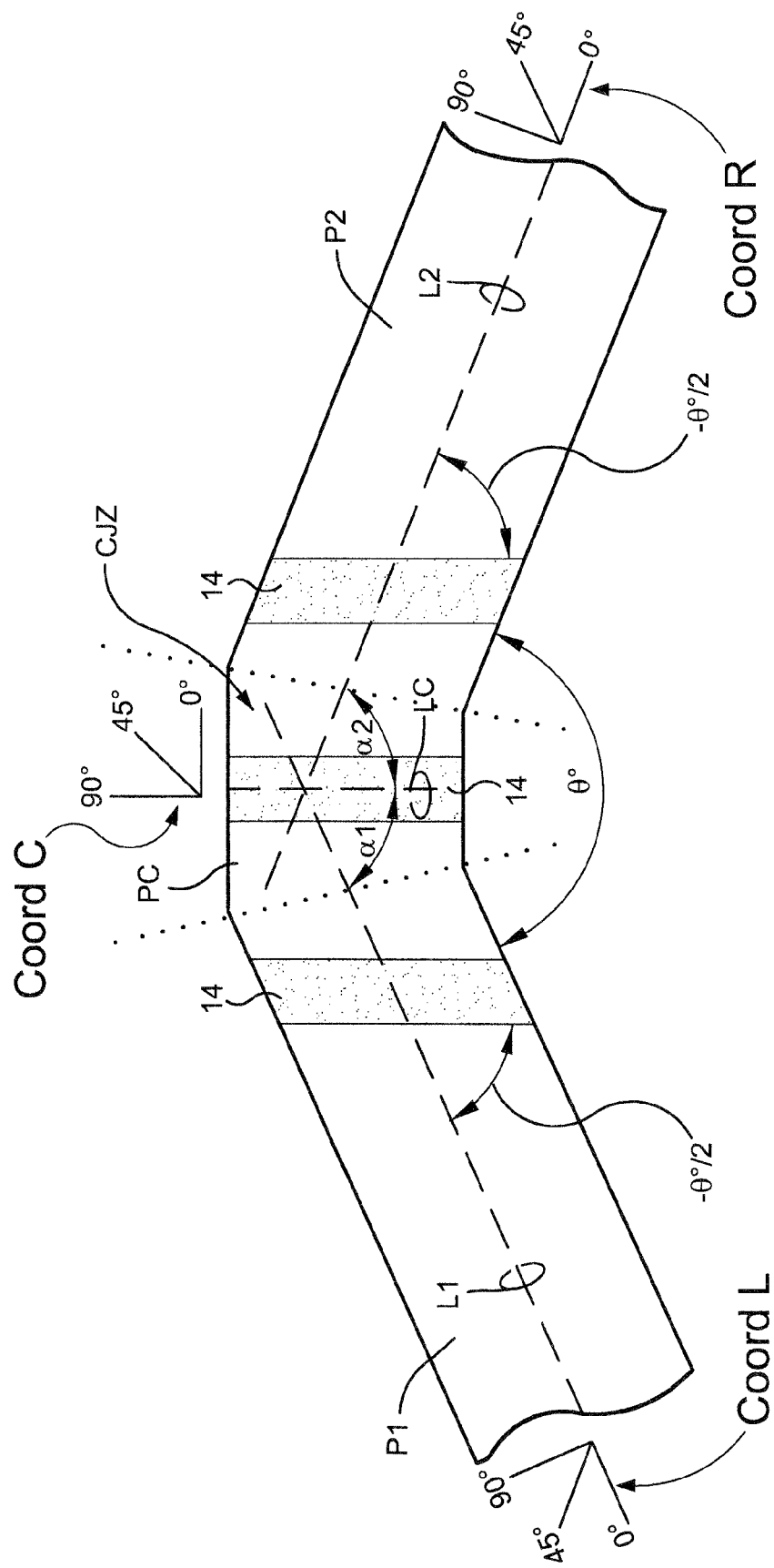
FIG. 3 is a schematic top plan view diagram of the exemplary illustrative non-limiting composite material component depicted in FIG. 1 showing a third technique for composite material lay-up.

A third lay-up procedure is shown in FIG. 3. In preferred embodiments, the third lay-up procedure is subsequently practiced after one or more plies are formed by the lay-up procedure shown in FIG. 2. As shown, the third lay-up procedure includes laminating 90° plies 14 relative to the central coordinate system COORD C, which thereby results in −θ°/2 plies relative to the principal directions of both the reference left and right coordinate systems COORD L and COORD R, respectively. Tables 5 and 6 below exemplify the angular relationships for θ angles of 135° and 120°, respectively, using the lay-up procedure of FIG. 3.

TABLE 5

Example for θ° = 135°
θ°
135°

| Left Side lay-up Coord L Reference | Junction Zone lay-up Coord C Reference | Right Side lay-up Coord R Reference |
|---|---|---|
| −θ°/2 | 90° | −θ°/2 |
| −67.5° | 90° | −67.5° |

TABLE 6

Example for θ = 120°
θ°
120°

| Left Side lay-up Coord L Reference | Junction Zone lay-up Coord C Reference | Right Side lay-up Coord R Reference |
|---|---|---|
| −θ°/2 | 90° | −θ°/2 |
| −60° | 90° | −60° |

As can be seen by the lay-up procedure of FIG. 3, no ply interruption is necessary and both parts P1 and P2 are laminated simultaneously with the same angle ply −θ°/2. Also, the central junction zone CJZ exhibits a naturally balanced 90° ply relative to the central coordinate system COORD C.

Figure 4:
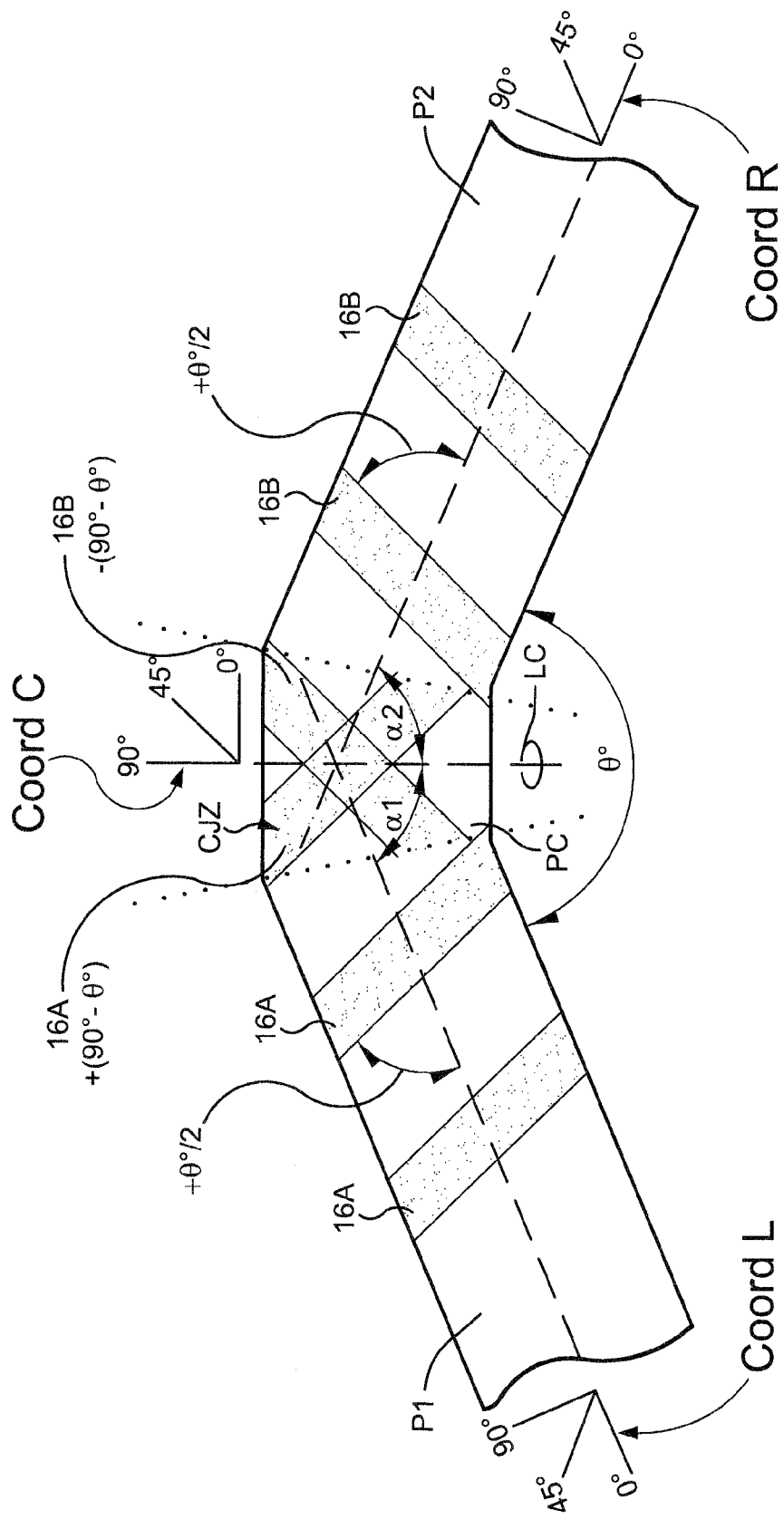
FIG. 4 is a schematic top plan view diagram of the exemplary illustrative non-limiting composite material component depicted in FIG. 1 showing a fourth technique for composite material lay-up.

A fourth lay-up procedure is shown in FIG. 4. In preferred embodiments, the fourth lay-up procedure is subsequently practiced after one or more plies are formed by the lay-up procedure shown in FIG. 3. As shown, the fourth lay-up procedure includes laminating +(90°−θ°/2) and −(90°−θ°/2) plies (noted by reference numerals 16A and 16B, respectively) relative to the central coordinate system COORD C. This lay-up procedure thereby results in +θ°/2 plies relative to the principal directions of the reference left and right coordinate systems COORD L and COORD R, respectively. Tables 7 and 8 below exemplify the angular relationships for θ angles of 135° and 120°, respectively, using the lay-up procedure of FIG. 4.

TABLE 7

Example for θ° = 135°
θ°
135°

| Left Side lay-up Coord L Reference | Junction Zone lay-up Coord C Reference | Right Side lay-up Coord R Reference |
|---|---|---|
| +θ°/2 | +(90° − θ°) | — |
| — | −(90° − θ°) | +θ°/2 |
| +67.5° | −45° | — |
| — | +45° | +67.5° |

TABLE 8

Example for θ° = 120°
θ°
120°

| Left Side lay-up Coord L Reference | Junction Zone lay-up Coord C Reference | Right Side lay-up Coord R Reference |
|---|---|---|
| +θ°/2 | +(90° − θ°) | — |
| — | −(90° − θ°) | +θ°/2 |
| +60° | −30° | — |
| — | +30° | +60° |

The fourth lay-up procedure may be used to provide balancing of the −θ°/2 plies 14 obtained by the third lay-up procedure of FIG. 3 discussed previously. By combining the third and fourth lay-up procedures of FIGS. 3 and 4, the parts P1 and P2 are thereby provided with a balanced laminate ±θ°/2, while the central junction zone CJZ is also provided with a balanced laminate 90° and ±(90°−θ°/2)/

The lay-up procedures are most preferably practice in pairs so as to preserve balancing. Thus, for example, the lay-up procedure of FIG. 1 is preferably paired with the lay-up procedure of FIG. 2, while the lay-up procedure of FIG. 3 is paired with the lay-up procedure of FIG. 4. That is, the first lay-up procedure of FIG. 1 may be practiced before or after the second lay-up procedure of FIG. 2 with which it is paired. Similarly, the third lay-up procedure of FIG. 3 may be practiced before or after the fourth lay-up procedure of FIG. 4 with which it is prepared. In addition, the paired lay-up procedures of FIGS. 1 and 2 do not necessarily need to be accompanied by the paired lay-up procedures of FIGS. 3 and 4. That is, a structure may be formed with either of the paired lay-up procedures of FIGS. 1 and 2 or FIGS. 3 and 4. Furthermore, if a structure is formed with both paired lay-up procedures, the paired procedures of FIGS. 1 and 2 may be practiced before or after the paired lay-up procedures of FIGS. 3 and 4. Layers other than those associated with the lay-up procedures of FIGS. 1-4 may be interposed between the individual lay-up layers of the procedures shown in FIGS. 1-4. The exact sequence of lay-up procedures and/or the number of plies in each lay-up procedure is dependent upon the particular structural component being formed as well as other design criteria which will be understood by those skilled in this art.

Benefits of the lay-up procedures described herein may include:
- providing a symmetrical and balanced lay-up on all skin regions (a characteristic that prevents warpage after curing, reducing undesirable residual and "coupling" stresses;
- allowing the use of a unique central coordinate system for laminating the entire part (a potential drawing and process simplification);
- integrating three rejections (i.e., part P1, part P2 and the central junction zone CJZ) in a single part; and/or
- reducing the number of ply joints and joints with potentially larger ply superposition regions.

Therefore, while the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:

1. A method for making a balanced laminate composite structure comprised of a central part having a longitudinal axis coincident with a central axis of the composite structure and establishing a central lamination junction zone defining a central coordinate system COORD C, and left and right component parts joined to the central part at the central lamination zone and having respective longitudinal axes establishing equal angles with respect to the longitudinal axis of the central junction zone and establishing left and right lamination zones defining left and right coordinate systems COORD L and COORD R, respectively, the method comprising:
   (i) laying up 0° composite material plies relative to the central coordinate system COORD C of the central lamination junction zone so as to achieve $+(90°-\theta°/2)$ plies relative to the left and right coordinate systems COORD L and COORD R of the left and right two parts, respectively, and
   (ii) laying up $+(180°-\theta°)$ and $-(180°-\theta°)$ plies relative to the central coordinate system COORD C of the central laminate junction zone so as to achieve $-(90°-\theta°/2)$ plies relative to the left and right coordinate systems COORD L and COORD R of the left and right parts, respectively.

2. The method of claim 1, wherein step (i) is practiced before or after step (ii).

3. The method of claim 1, further comprising:
   (iii) laying up 90° composite material plies relative to the central coordinate system COORD C of the central lamination junction zone so as to achieve $-\theta°/2$ plies relative to the left and right coordinate systems COORD L and COORD R of the left and right parts, respectively; and
   (iv) laying up $+(90°-\theta°)$ and $-(90°-\theta°)$ composite material plies relative to the central coordinate system COORD C of the central junction zone so as to achieve $+\theta°/2$ plies relative to the left and right coordinate systems COORD L and COORD R of the left and right parts, respectively.

4. The method of claim 3, wherein step (iii) is practiced before or after step (iv).

5. The method of claim 4, wherein steps (iii) and (iv) are practiced before or after steps (i) and (ii).

6. The method of claim 1, wherein $\theta$ is greater than 90° and less than 180°.

7. The method of claim 6, wherein $\theta$ is about 120° or about 135°.

8. A method for making a balanced laminate composite structure comprised of a central part having a longitudinal axis coincident with a central axis of the composite structure and establishing a central lamination junction zone defining a central coordinate system COORD C, and left and right component parts joined to the central part at the central lamination zone and having respective longitudinal axes establishing equal angles with respect to the longitudinal axis of the central junction zone and establishing left and right lamination zones defining left and right coordinate systems COORD L and COORD R, respectively, the method comprising:
   (a) laying up 90° composite material plies relative to the central coordinate system COORD C of the central lamination junction zone so as to achieve $-\theta°/2$ plies relative to the left and right coordinate systems COORD L and COORD R, of the left and right parts, respectively; and
   (b) laying up $+(90°-\theta°)$ and $-(90°-\theta°)$ composite material plies relative to the central coordinate system COORD C of the central junction zone so as to achieve $+\theta°/2$ plies relative to the left and right coordinate systems COORD L and COORD R of the left and right parts, respectively.

9. The method of claim 8, wherein step (a) is practiced before or after step (b).

10. The method of claim 8, wherein $\theta$ is greater than 90° and less than 180°.

11. The method of claim 10, wherein $\theta$ is about 120° or about 135°.

12. A composite structure comprised of:
   a central part having a longitudinal axis coincident with a central axis of the composite structure and establishing a central junction zone defining a central coordinate system COORD C, and
   left and right component parts joined to the central part at the central lamination zone and having respective longitudinal axes establishing equal angles with respect to the longitudinal axis of the central junction zone and establishing left and right lamination zones defining left and right coordinate systems COORD L and COORD R, respectively, wherein
   the composite structure includes:
   (i) 0° composite material plies relative to the central coordinate system COORD C of the central lamination junction zone, the 0° composite material plies forming $+(90°-\theta°/2)$ plies relative to the left and right coordinate systems COORD L and COORD R of the left and right parts, respectively, and
   (ii) $+(180°-\theta°)$ and $-(180°-\theta°)$ plies relative to the central coordinate system COORD C of the central lamination junction zone, the $+(180°-\theta°)$ and $-(180°-\theta°)$ plies forming $-(90°-\theta°/2)$ plies relative to left and right coordinate systems COORD L and COORD R of the left and right parts, respectively.

13. The composite structure of claim 12, wherein the 0° composite material plies (i) are positioned before or after the $+(180°-\theta°)$ and $-(180°-\theta°)$ plies (ii).

14. The composite structure of claim 12, further comprising:
   (iii) 90° composite material plies relative to the central coordinate system COORD C of the central junction zone, the 90° plies forming $-\theta°/2$ plies relative to the left and right coordinate systems COORD L and COORD R of the left and right parts, respectively; and (iv) $+(90°-\theta°)$ and $-(90°-\theta°)$ composite material plies relative to the central coordinate system COORD C of the central junction zone, the $+(90°-\theta°)$ and $-(90°-\theta°)$ plies forming $+\theta°/2$ plies relative to the left and right coordinate systems COORD L and COORD R of the left and right parts, respectively.

15. The composite structure of claim 14, wherein the 90° composite material plies (iii) are positioned before or after the $+(90°-\theta°)$ and $-(90°-\theta°)$ composite material plies (iv).

16. The composite structure of claim 15, wherein the 90° composite material plies (iii) and the $+(90°-\theta°)$ and $-(90°-\theta°)$ composite material plies (iv) are positioned before or after the 0° composite material plies (i) and the $+(180°-\theta°$ and $-(180°-\theta°)$ plies (ii).

17. An aircraft component which comprises a composite structure of claim 14.

18. The composite structure of claim 12, wherein $\theta$ is greater than 90° and less than 180°.

19. The composite structure of claim 18, wherein $\theta$ is about 120° or about 135°.

20. An aircraft component which comprises a composite structure of claim 12.

21. A composite structure comprised of:
a central part having a longitudinal axis coincident with a central axis of the composite structure and establishing a central junction zone defining a central coordinate system COORD C, and
left and right component parts joined to the central part at the central lamination zone and having respective longitudinal axes establishing equal angles with respect to the longitudinal axis of the central junction zone and establishing left and right lamination zones defining left and right coordinate systems COORD L and COORD R, respectively, wherein the composite structure includes:
(a) 90° composite material plies relative to the central coordinate system COORD C of the central junction zone, the 90° plies forming $-\theta°/2$ plies relative to the left and right coordinate systems COORD L and COORD R of the left and right parts, respectively; and
(b) $+(90°-\theta°)$ and $-(90°-\theta°)$ composite material plies relative to the central coordinate system COORD C of the central junction zone, the)$+(90°-\theta°)$ and $-(90°-\theta°)$ plies forming $+\theta°/2$ plies relative to the left and right coordinate systems COORD L and COORD R of the left and right parts, respectively.

22. The composite structure of claim 21, wherein the 90° composite material plies (a) are positioned before or after the $+(90°-\theta°)$ and $-(90°-\theta°)$ composite material plies (b).

23. The composite structure of claim 21, wherein $\theta$ is greater than 90° and less than 180°.

24. The composite structure of claim 23, wherein $\theta$ is about 120° or about 135°.

25. An aircraft component which comprises a composite structure of claim 21.

* * * * *